US006946822B2

(12) United States Patent
Cincinelli et al.

(10) Patent No.: US 6,946,822 B2
(45) Date of Patent: Sep. 20, 2005

(54) DC/DC CONVERTER WITH FILTER FOR LIMITING THE OSCILLATION OF THE INPUT CURRENT AND ASSOCIATED METHOD

(75) Inventors: Lorenzo Cincinelli, Arezzo (IT); Sauro Macerini, Arezzo (IT)

(73) Assignee: MagneTek, S.p.A., Arrezo (IT)

( * ) Notice: Subject to any disclaimer, the term of this patent is extended or adjusted under 35 U.S.C. 154(b) by 0 days.

(21) Appl. No.: 10/463,831

(22) Filed: Jun. 17, 2003

(65) Prior Publication Data

US 2004/0042238 A1 Mar. 4, 2004

(30) Foreign Application Priority Data

Jun. 17, 2002 (EP) ............................................ 0245389

(51) Int. Cl.[7] ................................................ G05F 1/56
(52) U.S. Cl. ...................................................... 323/282
(58) Field of Search ............................... 323/280, 282, 323/283, 285, 351

(56) References Cited

U.S. PATENT DOCUMENTS 6,181,120 B1    1/2001    Hawkes et al. ............. 323/282
6,225,794 B1 *  5/2001    Criscione et al. ........... 323/283
6,680,604 B2 *  1/2004    Muratov et al. ............. 323/285
6,713,995 B2 *  3/2004    Chen .......................... 323/284

OTHER PUBLICATIONS

EP 1 187 303 A2 published Mar. 13, 2002 to Yasushi Katayama.

DE 198 31 498 A1 Published Feb. 4, 1999 to Adolf Nathan.

EP 0 910 157 A1 published Apr. 21, 1999 to Marcello Criscione, et al.

* cited by examiner

Primary Examiner—Adolf Berhane
(74) Attorney, Agent, or Firm—Waddey & Patterson; Mark J. Patterson

(57) ABSTRACT

The DC/DC converter provides an output current which is periodically variable over time and includes a control network which generates a variable reference signal for the input current which is substantially smoothed and obtained from the difference between the output voltage and a reference voltage. The substantially smoothed reference signal causes a variation in the duty cycle of the converter in order to compensate for the variation in the output voltage resulting from a variation in the output current.

25 Claims, 4 Drawing Sheets

DC/DC CONVERTER WITH FILTER FOR LIMITING THE OSCILLATION OF THE INPUT CURRENT AND ASSOCIATED METHOD

APPLICATION FOR UNITED STATES LETTERS PATENT

This application claims benefit of co-pending European Patent Application Serial No. 02425389.0 filed Jun. 17, 2002, entitled "DC/DC Converter with Filter for Limiting the Oscillation of the Input Current and Associated Method" which is hereby incorporated by reference.

Be it known that we, Lorenzo Cincinelli, a citizen of Italy, residing at Via Alcide De Gasperi 35, 52023 Levane, Arezzo Italy; Sauro Macerini, a citizen of Italy, residing at Via Perugia 6, 52023 Levane, Arezzo Italy; have invented a new and useful "DC/DC Converter with Filter for Limiting the Oscillation of the Input Current and Associated Method."

BACKGROUND OF THE INVENTION

The present invention relates generally to a DC/DC converter which can be connected to a load which absorbs an output current from the converter which is variable over time, for example having a cyclical variation at a frequency of 100 or 120 Hz.

In many applications the DC/DC converter is used as a component for outputting a continuous voltage to a load which absorbs a current in a periodic manner. The oscillation of the current absorbed by the load, if no special measures are taken, results in a corresponding oscillation or ripple affecting the input current of the DC/DC converter. In certain cases this oscillation or ripple is not acceptable or in any case must be limited. This requirement arises, for example, when the continuous voltage source connected to the input of the DC/DC converter consists of one or more fuel cells which can only tolerate small oscillations of the current supplied or in applications in the telecommunications sector, where pulsed absorption in the psophometric range would result in disturbance of the transmissions along the telephone line.

In order to reduce the ripple affecting the input current of a DC/DC converter at present passive filters of the LC type are used. In order to eliminate the oscillation of the input current large inductances are required. These inductances are costly, bulky and heavy and therefore constitute a problem with regard to the formation of small-size and low-cost circuits.

SUMMARY OF THE INVENTION

One object of the present invention is to provide a DC/DC converter of the above mentioned type which avoids the drawbacks of conventional converters, eliminating the LC passive filters used at present and in any case reducing sufficiently the ripple of the current absorbed by the converter.

Another object of the invention is also to provide a method for smoothing the input current of a DC/DC converter without using LC passive filters.

Essentially, according to a first aspect of the invention a DC/DC converter is provided, with an output current which is cyclically variable over time, comprising a control network which generates a variable reference signal for the input current which is substantially smoothed and obtained from the difference between the output voltage and an additional reference voltage, and in which said substantially smoothed current reference signal causes a variation in the duty cycle of the converter in order to compensate for the variation in the output voltage resulting from a variation in the output current. A "substantially smoothed reference signal" is understood as meaning a signal which is not affected (or affected only to a very small degree) by the periodic oscillations of the output voltage resulting from the oscillating frequency of the current absorbed by the load. In so doing, the duty cycle of the converter may be modified without the feedback signal being affected by the ripple of the output voltage caused by the pulsed absorption of current at the output itself.

According to one embodiment of the invention, the control network comprises a node for comparison of the input current and said reference signal. The difference between said two signals, suitably compensated, causes a variation in the duty cycle of the converter.

The control network may in practice comprise a first stage for stabilization of the value of the output voltage of the converter and a second stage for controlling the input current of the converter. The second stage receives, at its input, the reference signal, supplied by the first stage, and modifies the duty cycle of the DC/DC converter in order to keep the input current of the converter more or less "smoothed".

In another embodiment of the invention the control network comprises in combination: a first comparison node in which the output voltage of the converter is compared with the reference voltage in order to generate an error signal and a first proportional-integrative network which receives at its input said error signal and the output of which forms the reference signal of the loop for regulating the input current. The effect of this proportional-integrative network, in addition to compensation of the loop response of the output voltage, is that of smoothing of the current reference signal, in order to eliminate or reduce substantially the ripple, so as-to be able to use this signal in a node for comparison with an input current signal and generate a feedback which modifies the duty cycle of the converter. It is thus possible to eliminate from the error signal the influence on it of the periodic oscillation in the voltage at the terminals of the output capacitor of the DC/DC converter owing to the variable absorption, over time, of the current by the load.

In practice the proportional-integrative network has a cut-off frequency which is substantially lower than the frequency of the periodic variation in the output current of the converter, i.e. the current which is supplied by it to the load. In this way the reference signal which is generated by the circuit is an averaged signal.

Essentially, the cut-off frequency of the proportional-integrative network of the first stage of the control network may be at least one order of magnitude less than the oscillation frequency of the output current of the converter. Therefore, if the converter is associated with a load which absorbs a current oscillating at a frequency of 100 Hz, the cut-off frequency of the proportional-integrative network of the first stage may be in the region of 1–10 Hz.

Advantageously, the second stage of the control network comprises a circuit which generates an error signal depending on the difference between the reference signal generated by the first stage and a signal which is proportional to the input current of the converter. In practice, the second stage comprises a second comparison node in which the reference signal supplied by the first stage is compared with a current signal proportional to the input current of said converter.

The output signal from this second comparison node may be advantageously applied to a second proportional-integrative network having a cut-off frequency substantially higher than the output current frequency, for example higher than the latter by at least one order of magnitude or more. The pass band of the proportional-integrative network of the second stage is in any case such that its upper limit is several times less (and preferably one order of magnitude less) than the switching frequency of the converter. The output of the second proportional-integrative network is used to modify the duty cycle of the converter.

A galvanic insulation may be provided between the first and the second stage of the control network, for example in the form of an opto-electronic coupler.

Further advantageous features and embodiments of the converter according to the invention are indicated in the accompanying dependent claims.

According to a further aspect of the present invention, a method for smoothing the input current of a DC/DC converter, the output of which is connected to a load which absorbs current in a cyclically variable manner, is envisaged. Essentially, the method according to the invention is characterized in that the duty cycle of said converter is modified according to the variation in current absorbed by said load so as to keep the value of the input current of the converter substantially smoothed.

Unlike conventional filtering systems with LC passive filters, therefore, the device and the method according to the present invention perform active filtration, or modification, by means of a control loop, of the duty cycle of the converter so that the current absorbed by it at its input follows the slow variations in the output current, depending on the current absorbed by the load, but is not influenced by the ripple of the output voltage, i.e. by the cyclical variation at the absorption frequency of the load.

In a practical embodiment, the method according to the invention comprises the steps of: generating a reference signal, which is a function of the difference between the average value of the output voltage of said converter and a reference voltage; generating a feedback signal, which is a function of said reference signal and the input current of said converter; modifying the duty cycle of said converter depending on the feedback signal, thereby reducing or eliminating the oscillations in the input current determined by the oscillations in the current absorbed by said load.

In one particular embodiment, the method may comprise the steps of comparing a signal proportional to the output voltage of said converter with a reference value and generating an error signal; applying the error signal to a first proportional-integrative network in order to generate the reference signal of the current loop; comparing said reference signal with the input current of said converter in order to generate a feedback signal; and using said feedback signal in order to modify the duty cycle of the converter.

DESCRIPTION OF THE PREFERRED EMBODIMENTS

Figure 1:
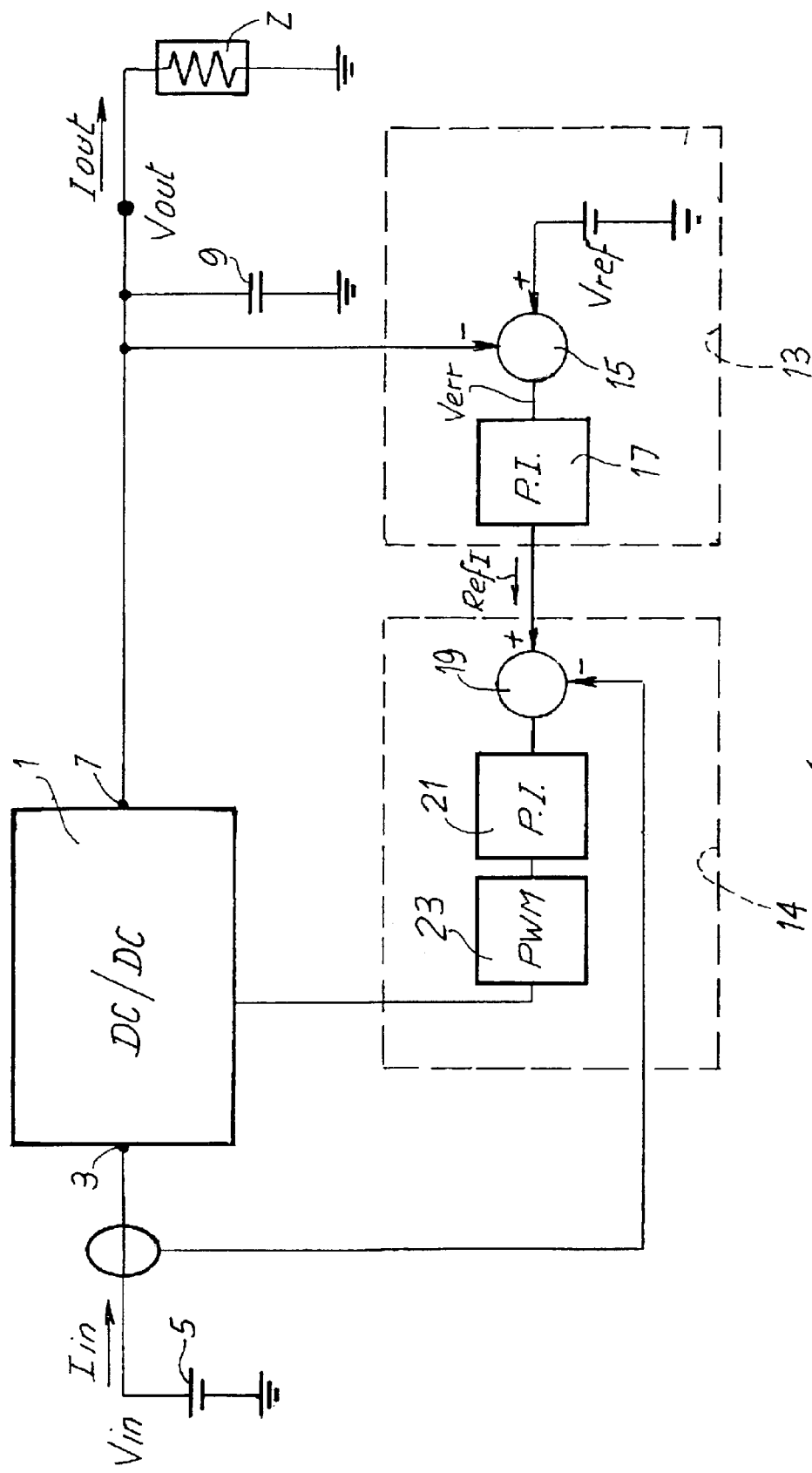
FIG. 1 shows a functional diagram of the converter with its control network.

The principle forming the basis of the invention will be described with initial reference to the diagram shown in FIG. 1. Here 1 denotes generally a DC/DC converter with an input 3 connected to a voltage source 5 where $V_{in}$ indicates the continuous supply voltage. $I_{in}$ indicates the input current of the DC/DC converter 1. The latter may have any configuration and will comprise characteristically a bridge or a half-bridge of controlled switches with a duty cycle, the value of which is modified on the basis of the signal generated by the control network which will be described below. The output 7 of the DC/DC converter 1 is connected to a load generally denoted by Z. $V_{out}$ and $I_{in}$ indicate the output voltage and the output current, respectively. A smoothing capacitor 9 is also connected to the output.

Figure 2:
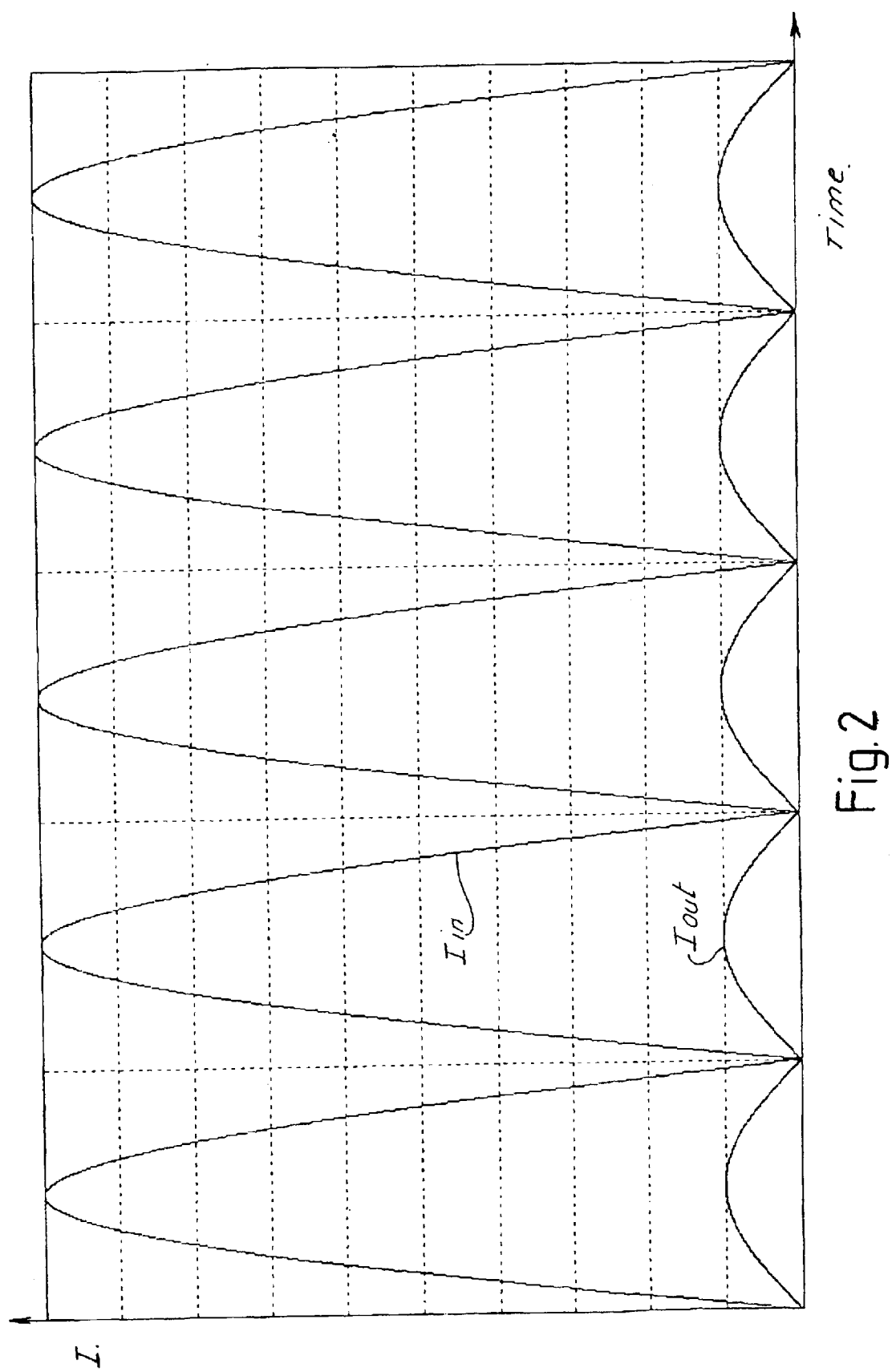
FIG. 2 shows a diagram illustrating the input current and output current without the filtering effect of the control network.

The load Z is typically a load which absorbs a pulsed current, for example with a frequency of 100 Hz. FIG. 2 shows the progression of the current $I_{out}$ output from the converter 1, i.e. the current absorbed by the load Z. In the absence of a suitable filter, the oscillation of the output current results in an intense oscillation, at the same frequency, of the input current $I_{in}$. The progression of the input current $I_{in}$ of the converter in the absence of a filter is also shown in FIG. 2.

In order to avoid or reduce drastically this oscillation, a control network generally denoted by 11 is provided. The network 11 comprises, in the example shown, a first stage 13 and a second stage 14 which are connected together for example by means of an opto-electronic coupler, not shown in the simplified diagram according to FIG. 1.

The stage 13 comprises a comparison node or adder 15 which receives at its input a reference voltage $V_{ref}$ and a voltage signal proportional to the output voltage $V_{out}$. The difference between these two signals, indicated by $V_{err}$ forms the input of a proportional-integrative network 17, having a cut-off frequency which is much lower, for example by one order of magnitude, than the oscillation frequency of the output current $I_{out}$. The output signal (RefI) of the proportional-integrative network 17 therefore constitutes a reference signal which is a function of the difference between the average value of the output voltage $V_{out}$ and the constant reference voltage $V_{ref}$.

The error signal RefI is sent to the second stage 14 to a comparison node or adder 19 where it is compared with a current signal, which is a function of the input current $I_{in}$. This second signal may be detected by means of a reading resistor, a Hall sensor or any other equivalent system.

The output signal of the comparison node 19 is sent to a proportional-integrative network 21 which has a pass band which is sufficiently wide to ensure a high gain at the frequency at which the current $I_{out}$ oscillates, i.e. typically 100 Hz in the example shown. The output signal of the proportional-integrative network 21 drives a PWM circuit 23, the output of which controls the duty cycle of the DC/DC converter 1. The proportional-integrative network 21 has the function of compensating the frequency response so as to guarantee a phase margin for the system fed back with current.

Essentially, the control network described operates as follows: The main parameter which must be stabilized by the control network is the DC value of the output voltage $V_{out}$. This voltage must satisfy, in terms of amplitude, the requirements of the load Z connected to the converter 1. Control of the voltage $V_{out}$ is performed by the comparison node 15 which compares the output voltage $V_{out}$ with the reference value $V_{ref}$, extracting an error signal $V_{err}$ applied to the proportional-integrative network 17. The latter has the function of preventing the stage 13 from reacting to the variations in the output voltage $V_{out}$ which are due to the ripple of the current $I_{out}$. In this way the reference signal RefI output by the proportional-integrative network 17 (which constitutes the reference signal for the input current) will have a waveform which is substantially smoothed, with a slight residual ripple which will be correspondingly smaller the lower the cut-off frequency of the proportional-integrative network 17.

Basically the proportional-integrative network 17 performs integration of the ripple which is induced on the voltage $V_{out}$, owing to the pulsed load applied.

Figure 3:
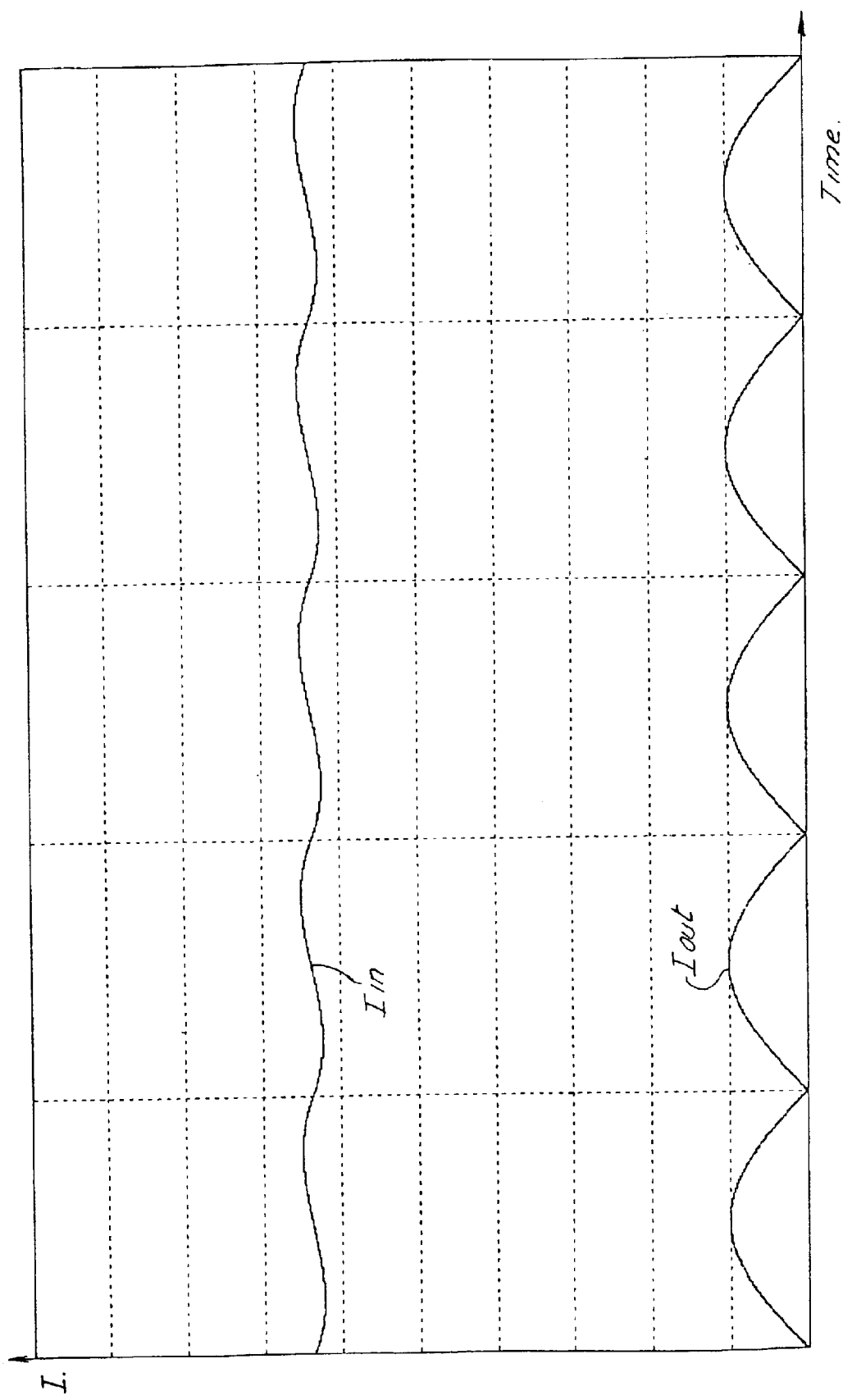
FIG. 3 shows the progression of the input and output current when the control network is present and operating.

The reference signal RefI is used as a reference in the comparison node 19 of the stage 14. Comparing, in the comparison node 19, the reference signal RefI with the input current signal $I_{in}$ in fact ensures that the input current follows, in terms of value and waveform, the error of the output voltage. Since the latter (as result of the integrating operations performed by the proportional-integrative network 17) has a continuous and smoothed form, the input current $I_{in}$ will be continuous and smoothed. An average-value reduction of the output voltage $V_{out}$ will produce an increase in the reference signal RefI output by the stage 13. The output signal of the comparison node 19 will consequently increase, with a consequent increase in the input current $I_{in}$ of the converter, owing to the PWM signal generated by the PWM block 23. This will result in an increase in the value of the output voltage, restoring it to the desired value set by the reference value $V_{ref}$. FIG. 3 shows again the progression of the output current $V_{out}$ and the progression of the input current $I_{in}$ in the presence of the control network 11. As can be seen, when there is a pulsed output current $I_{out}$ which is entirely similar to that of FIG. 2, the input current $I_{in}$ is smoothed and has a very small ripple at the frequency which characterizes the output current, said ripple being entirely acceptable also for continuous-current sources 5 which cannot withstand intense variations in the current supplied.

The control network described hitherto may have two limiting aspects: a high ripple, at the frequency of the load, on the output voltage $V_{out}$; and a relatively slow response of the control network 11, with a consequent marked fluctuation in the output voltage $V_{out}$ when there is a sudden variation in load. These two negative aspects can be overcome in a satisfactory manner as follows. As regards the first aspect, the ripple on the output voltage $V_{out}$ may be reduced by adopting a value of the capacitance of the output capacitor 9 which is about 20–50% higher than the values normally used for these output capacitors of DC/DC converters. As a result of over-dimensioning, by this order of magnitude, of the output capacity, it is possible to attenuate the ripple on the output voltage $V_{out}$ to acceptable values in the region of 5–10% of the DC value. For example, the capacitance of the output capacitor may be in the region of 1000 uF for output voltages of about 360 $V_{AC}$ and a maximum power of about 1500 W.

As regards the second limiting aspect mentioned above, the speed of response of the control network may be increased during the transients characterized by intense fluctuations in the load by means of the introduction of a network which de-linearizes the system in the case of large signal variations, making it very quick and fast if the variation in error exceeds a predefined value and restoring slow operation of the network in the vicinity of the normal operating value. This may be achieved for example digitally or using a simple network composed of two diodes in an anti-parallel arrangement or by means of other active methods which however do not affect the general operating principle of the control network.

Figure 4:
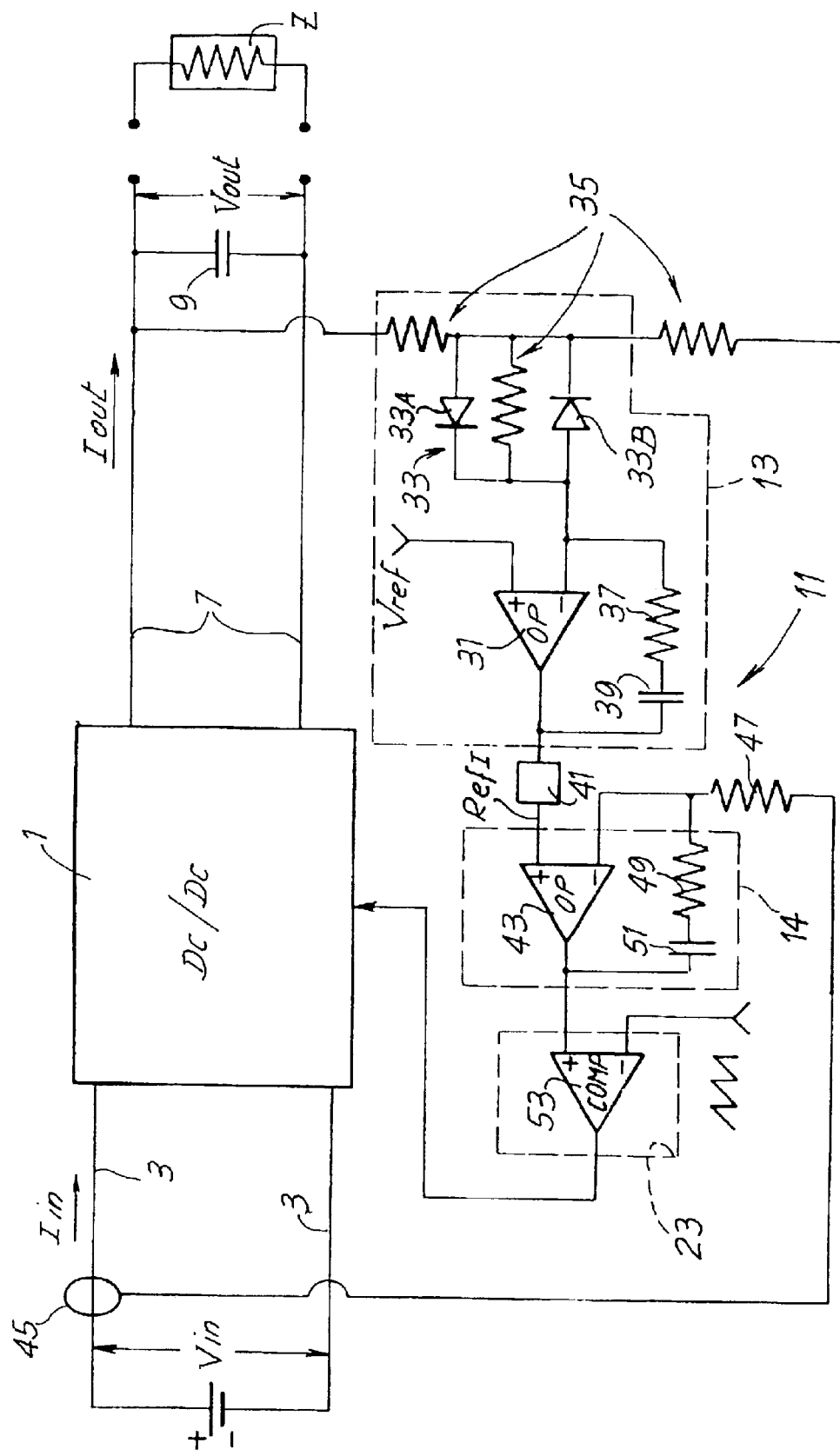
FIG. 4 shows a simplified diagram of a circuit arrangement of the converter with the respective control network schematically shown in FIG. 1.

FIG. 4 shows a simplified circuit diagram implementing the principle described with reference to FIG. 1. Identical numbers indicate parts which are identical or correspond to the parts illustrated in the functional diagram shown in FIG. 1. The stage 13 of the control network 11 comprises an inverting operational amplifier 31, to the non-inverting input of which the reference voltage $V_{ref}$ is applied and the inverting terminal of which is connected by means of a de-linearization network 33 to a voltage divider 35. The de-linearization network 33 comprises two diodes 33A and 33B in an anti-parallel arrangement, for the purposes described above. An RC network comprising a resistor 37 and a capacitor 39 is provided between the inverting terminal and the output of the operational amplifier 31. The output of the operational amplifier 31 is coupled by means of an opto-electronic coupler 41 to the non-inverting input of a second operational amplifier 43 forming part of the stage 15. The inverting terminal of the inverting amplifier 43 is connected to a Hall sensor which is schematically indicated at 45, by means of a resistor 47. An RC network comprising a resistor 49 and a capacitor 51 is provided between the inverting terminal and the output of the operational amplifier 43.

The output of the operational amplifier 43 is connected to the non-inverting terminal of a further operational amplifier 53 which generates the PWM driving signal for switching the switches controlled by the DC/DC converter 1.

It is understood that the drawing shows only one example provided by way of practical demonstration of the invention, it being possible to vary the forms and arrangements of the invention without thereby departing from the scope of the idea underlying the invention. Any presence of reference numbers in the accompanying claims has the object of facilitating reading thereof in the light of the above description and accompanying drawings and does not limit in any way the protective scope thereof.

Thus, although there have been described particular embodiments of the present invention of a new and useful DC/DC Converter with Filter for Limiting the Oscillation of the Input Current and Associated Method, it is not intended that such references be construed as limitations upon the scope of this invention except as set forth in the following claims.

What is claimed is:

1. A DC/DC converter having a converter output current which is periodically variable over time, further comprising a control network which generates a variable reference signal for a converter input current which is substantially smoothed and obtained from a difference between a converter output voltage and a reference voltage, and in which said reference signal causes a variation in a duty cycle of the converter in order to compensate for variation in the converter output voltage resulting from a variation in the converter output current.

2. The converter according to claim 1, in which said control network comprises a comparison node for comparison of the converter input current and said reference signal, the comparison node providing an output signal used to vary the duty cycle of the converter.

3. The converter according to claim 1 further comprising a first stage for stabilization of the converter output voltage and a second stage for controlling the converter input current, the second stage receiving said reference signal from said first stage and modifying the duty cycle of the converter to keep the converter input current substantially constant.

4. The converter according to claim 1 in which said control network comprises:

a first comparison node in which the converter output voltage is compared with the reference voltage to generate an error signal; and a first proportional-integrative network which receives said error signal at an integrative network input and generates said reference signal at an integrative network output.

5. The converter according to claim 1 further comprising:

a first stage for stabilization of the converter output voltage and a second stage for controlling the converter input current, the second stage receiving said reference signal from said first stage and modifying the duty cycle of the converter to keep the converter input current substantially constant;

the first stage further comprising a first comparison node in which the converter output voltage is compared with the reference voltage to generate an error signal and a first proportional-integrative network which receives said error signal at an integrative network input and generates said reference signal at an integrative network output.

6. The converter according to claim 5 in which said first proportional-integrative network has a cut-off frequency which is substantially less than a frequency of the converter output current.

7. The converter according to claim 6 in which the cut-off frequency of said first proportional-integrative network is at least one order of magnitude less than the frequency of the converter output current.

8. The converter according to claim 3 in which said second stage comprises a circuit which generates a feedback signal depending on the difference between the reference signal generated by the first stage and a current signal which is proportional to the converter input current.

9. The converter according to claim 8, in which said second stage comprises a second comparison node in which the reference signal supplied by the first stage is compared with said current signal proportional to the converter input current.

10. The converter according to claim 9 in which said second stage comprises a second proportional-integrative network with a cut-off frequency substantially higher than the frequency of the converter output current and in which said second proportional-integrative network receives an output signal from said second comparison node and generates an output signal for controlling the duty cycle of the converter.

11. The converter according to claim 10 in which the cut-off frequency of the second proportional-integrative network is at least one order of magnitude higher than the frequency of the converter output current.

12. The converter according claim 11 further comprising galvanic insulation between the first stage and the second stage of the control network.

13. The converter according to claim 12, in which said galvanic insulation comprises an opto-electronic coupler.

14. The converter according to claim 1 further comprising a de-linearization network for de-linearizing the control network in response to large variations in the converter output current.

15. The converter according to claim 14, in which said de-linearization network comprises two diodes in an anti-parallel arrangement.

16. The converter according to claim 3, in which said first stage comprises a first inverting operational amplifier having a non-inverting input to which said reference voltage is applied and an inverting input to which a signal proportional to the converter output voltage is applied, and an RC reaction network.

17. The converter according to at claim 16 in which said second stage comprises a second inverting operational amplifier having a non-inverting input to which the reference signal is applied and an inverting input to which a signal proportional to the converter input current is applied.

18. The converter according to claim 17 further comprising an output capacitor functional to smooth the converter output voltage.

19. The converter according to claim 10 in which the output signal of said second proportional-integrative network is applied to a PWM circuit to control, the PWM circuit being operative to control the duty cycle of the converter.

20. A method for smoothing a converter input current of a DC/DC converter having a converter output voltage connected to a load which absorbs converter output current in a cyclically variable manner, the method comprising modifying a duty cycle of said converter according to variations in the converter output current so as to keep a value of the converter input current substantially smoothed independently of the cyclical variation in the converter current absorbed by the load.

21. The method according to claim 20 further comprising the steps of:

generating a reference signal which is a function of a difference between an average value of the converter output voltage and a reference voltage, said reference signal forming a reference for a current loop;

generating a feedback signal, which is a function of said reference signal and the converter input current; and modifying the duty cycle of said converter in response to the feedback signal, to reduce variations in the converter input current determined by variations in the converter output current.

22. The method according to claim 20 further comprising the steps of:

comparing a signal proportional to the converter output voltage with a reference value and generating an error signal;

applying the error signal to a first proportional-integrative network to generate said reference signal;

comparing said reference signal with the converter input current order to generate a feedback signal; and using said feedback signal to modify the duty cycle of the converter.

23. The method according to claim 22, in which said first proportional-integrative network has a cut-off frequency which is at least one order of magnitude less than a frequency of the converter output current.

24. The method according to claim 23 in which the comparison between the reference signal and the converter input current generates an error signal which is applied to a second proportional-integrative network having a lower cut-off frequency which is at least one order of magnitude higher than the frequency of the converter output current, the second proportional-integrative network generating an output signal to modify the duty cycle of the converter.

25. The method according to claim 24, in which the output signal from the second proportional-integrative network drives a PWM circuit, the output of which controls the duty cycle of the converter.

* * * * *